Figure 1:
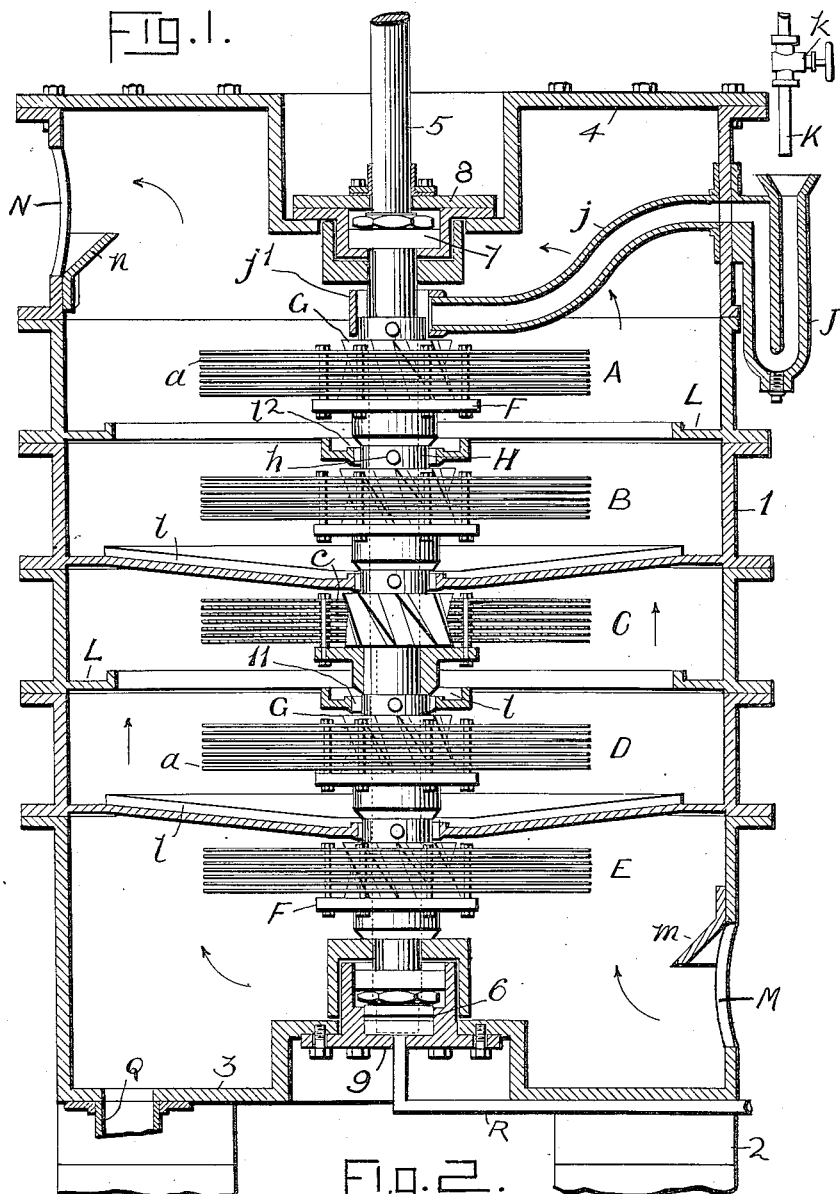

C. H. FOWLER & E. A. MEDLEY.
APPARATUS FOR TREATING GASES AND VAPORS TO THE ACTION OF LIQUIDS.
APPLICATION FILED OCT. 28, 1912.

1,050,013.

Patented Jan. 7, 1913.

UNITED STATES PATENT OFFICE.

CHARLES HOWARD FOWLER AND EDWARD ARNOLD MEDLEY, OF GREAT CROSBY, ENGLAND.

APPARATUS FOR TREATING GASES AND VAPORS TO THE ACTION OF LIQUIDS.

1,050,013.  Specification of Letters Patent.  Patented Jan. 7, 1913.

Application filed October 28, 1912. Serial No. 728,251.

*To all whom it may concern:*

Be it known that we, CHARLES HOWARD FOWLER and EDWARD ARNOLD MEDLEY, subjects of the King of Great Britain and Ireland, and residing at Cook's Lane, Great Crosby, in the county of Lancaster, England, have invented new and useful Improvements in Apparatus for Treating Gases and Vapors to the Action of Liquids.
This invention relates to improvements in apparatus for treating gases and vapors to the action of liquids sprayed across the passage traversed by the gas being treated, from horizontal disks rotating at a high rate of speed. Hitherto, in apparatus of this class, when used for treating dusty gases, it has not been possible to prevent solid deposits being formed on the underside of the disks, except by using a great quantity of liquid and such deposits seriously interfere with the balance of the rotating parts and finally necessitate the stopping of the apparatus. The great quantity of liquid required, hitherto for apparatus of this kind in which both surfaces of the disks were washed was such as greatly to restrict their general use even when water only was employed, as even when the latter was used over and over again large cooling and settling plants were necessitated.

According to this invention we continuously wash both sides of the disks with liquid and yet are able to use the liquid employed in wetting one series of disks for wetting other series in turn, and so keep low the quantity of liquid required and make the more general employment of apparatus of this class a commercial success. Whereas previous to this invention when the liquid was so used from one group of disks to the next the upper surfaces only of the disks were fed with liquid and deposits accumlated on the undersides with the results above stated.
We use on a vertical shaft revolubly mounted in a cylindrical casing preferably several series of closely spaced disks each having a central opening and all the disks of each series bolted to a flanged collar fixed to the shaft. In the central openings to the disks of each series are fixed to the shaft a number of vanes on which the liquid is allowed to drop. The vanes fling it off on to the surfaces of the disks and the casing in the form of a fine spray.

The liquid sprayed on to the sides of the casing is collected by eaves formed thereon and from these eaves radial channels conduct it to the shaft again over another series of disks and vanes. This spraying action is repeated as many times as are found to be efficient, a series of disks and vanes being used for each action, as a certain amount of the moisture is carried away with the gases and some falls to the bottom of the passage where it is collected and pumped up to the top again for further use.

Figure 2:
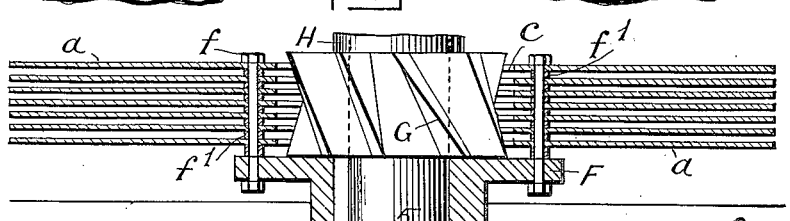

The drawing attached hereto, shows in Figure 1, a sectional elevation of an apparatus made in accordance with this invention, and Fig. 2 shows an enlarged sectional view of one series of disks and vanes. The apparatus shown has a casing circular in cross section. The section is taken through the gas inlet and outlet passages which are on opposite sides.

The vertical wall of the chamber is represented by 1, the foundation by 2, the base by 3, and the cover by 4. Centrally mounted in the casing is a vertical shaft 5, supported in a footstep bearing 6 in the base 3 and in a journal bearing 7 in the cover 4. The shaft 5 may conveniently be driven through a pulley fixed thereto and a belt, or directly by means of an electric motor, in the known way.

At equal distances apart are five groups or series A, B, C, D, E, of disks, each group or series being supported by and fixed to the shaft 5 by means of flanged collars F keyed to the shaft. The group C is shown in section, the other groups being shown in front elevation. The disks $a$ of each group have central openings $c$ larger than the shaft in diameter. All the disks of each group are fixed to flanged collars F by means of bolts $f$, distance pieces $f^1$ being inserted between the disks and between the latter and the collars. Around the shaft are fixed radial vanes G inside each group of disks. These are preferably helically arranged as shown, but may be arranged parallel with the shaft. They may have roughened or serrated surfaces so as to retard the flow of liquid thereon. Collars such as H are fixed to the shaft by means of screws $h$, and conveniently form distance pieces between the flanges F and the vanes G. The latter are formed on a collar which fits the shaft. The flanges F are keyed to prevent them turning on the shaft. Thus by releasing the screws $h$, the collars, vanes and disks may be slid off the shaft. The bearings 6 and 7 which are of known ball type, can be easily removed after the cover 8 and the bearing housing 9 have been detached.

The liquid may be directed on to the vanes and disks in the following way:—First, on the outside of the casing wall 1, is fixed a trapped sump J, sufficiently deep to resist the pressure of the gas passing through the apparatus. The liquid is fed into this from a supply pipe K fitted with a cock $k$. From the sump, a pipe $j$ is carried to a sleeve $j^1$ surrounding the shaft above the uppermost group of disks and vanes, which acts as a fender to prevent the liquid spreading outward. Around the wall of the casing in planes above each group of disks, except the uppermost, are formed annular channels or eaves L and from these channels, inclined radial channels 1 are conducted to an opening 11, in each case, around the shaft, the edge of the opening having a raised shallow lip $l^2$. Two radial channels pass from each annular channel L to the center of the group of disks the radial channels from one eave being at right angles to those from the annular eave below it.

The inlet orifice for the gas to the casing is represented by M and the outlet by N, the gases flowing upward around the disks as indicated by the arrows. Over the inlet orifice M is fixed a baffle $m$ and one $n$ under the outlet orifice.

A drain pipe Q is provided in the base 3 of the apparatus which is led to a sump not shown in the drawing. There is also shown one of the oil feeding pipes R for lubricating the footstep bearing 6.

When the apparatus is in action, the shaft being rotated at a high rate of speed, the liquid for treating the gases is led into the sump J and overflows down the pipe $j$ and falls on the uppermost group of vanes G. These vanes throw the liquid off by centrifugal action and by suitably proportioning the inclination thereof and the number of vanes to the speed and diameter of the shaft, the liquid is spread by them with substantial equality over all the surfaces of the disks, both the upper and under surfaces, and from the peripheries of the disks the liquid is flung across the gas passage in the form of a finely divided and rapidly moving spray. The sprayed liquid then runs down the wall of the casing and is collected in the uppermost channel or eave L and from the latter runs down the inclined radial channels $l$ toward the shaft 5, around which it falls on the second set of vanes and is spread over the surfaces of the second group of disks B and so that the action of spraying and collecting the spray is repeated until the spent liquid is drawn away through the drain pipe Q. The gas entering at N has to pass through the spray produced across the annular passage between the disks and the wall 1 of the casing.

What we claim as our invention and desire to secure by Letters Patent of the United States is:—

1. Apparatus for treating gases and vapors to the action of liquids, comprising a closed casing with inlet and outlet openings at opposite ends, a vertical rotary shaft protruding through one end, a series of closely spaced disks fixed to the shaft in the casing, each disk having a central opening therein, a flanged collar fixed to the shaft below the series of disks and supporting the same, a series of vanes fixed around the shaft in said openings for throwing the liquid radially outwardly along the sides of said disks, and a conduit for feeding the liquid employed to the shaft above said vanes.

2. Apparatus for treating gases and vapors to the action of liquids, comprising a closed casing with inlet and outlet openings, at opposite ends, a vertical rotary shaft protruding through one end, a series of closely spaced disks fixed to the shaft in the casing, each disk having a central opening therein, a flanged collar fixed to the shaft below said series of disks and supporting the same, a series of vanes fixed around the shaft in said openings for throwing the liquid radially outwardly along the sides of said disks, a stationary annular shield surrounding the shaft above said vanes and a conduit from the outside of the casing to said shield for conducting the liquid between the shield and shaft.

3. Apparatus for treating gases and vapors to the action of liquids, comprising a closed casing with inlet and outlet openings at opposite ends, a vertical rotary shaft protruding through one end of the casing, several series of closely spaced disks fixed to the shaft, each disk having a central opening therein, a flanged collar fixed to the shaft below each series of disks and supporting the same, a series of vanes fixed around the shaft in the openings of each series of disks for throwing the liquid radially outwardly along the sides of said disks, a conduit for feeding the liquid to the shaft above the uppermost series of vanes, an annular eave around the shaft immediately above the second and lower series of vanes having an annular passage between the shaft and the eave, a channel around the inside wall of the casing at a level above the said annular eave and below the series of disks above said eave, and radial channels leading from said channel to the eave, for the purpose set forth.

4. Apparatus for treating gases and vapors to the action of liquids, comprising a vertical closed cylindrical casing having an inlet opening on one side at one end and an outlet opening on the opposite side at the other end, a central vertical rotary shaft mounted in bearing therein and protruding through one end, several series of closely spaced disks fixed to said shaft at a convenient distance apart, each disk having a central opening around the shaft, a flanged collar fixed to the shaft below each series of disks and supporting the same, a space being left between the lower disk and the flange in each series, a series of inclined vanes fixed around the shaft in the openings of each series of disks for throwing the liquid radially outwardly along the sides of said disks, an annular channel around the wall of the casing inside at a level between each pair of series of disks, an annular eave around the shaft above each series of vanes and at a lower level than said annular channel, said eave having an outer annular lip of lesser depth, inclined radial channels leading from the annular channels to the said eaves, and a conduit for the liquid from the outside of said casing to the shaft above the uppermost series of vanes, for the purpose set forth.

In testimony whereof we have signed our names to this specification in the presence of two subscribing witnesses.

CHARLES HOWARD FOWLER.
EDWARD ARNOLD MEDLEY.

Witnesses:
RIDLEY JAMES URQUHART,
FRANK HENRY SHEARER.